(12) United States Patent
Laupa

(10) Patent No.: US 11,654,776 B2
(45) Date of Patent: May 23, 2023

(54) METHOD FOR CONTROLLING A ROTARY ELECTRICAL MACHINE IN ORDER TO COMPENSATE FOR THE TORQUE OSCILLATIONS OF A TRACTION CHAIN OF A MOTOR VEHICLE

(71) Applicant: Valeo Equipements Electriques Moteur, Creteil (FR)

(72) Inventor: Joachim Laupa, Créteil (FR)

(73) Assignee: Valeo Equipements Electriques Moteur, Creteil (FR)

( * ) Notice: Subject to any disclaimer, the term of this patent is extended or adjusted under 35 U.S.C. 154(b) by 191 days.

(21) Appl. No.: 17/256,433

(22) PCT Filed: Jun. 28, 2019

(86) PCT No.: PCT/FR2019/051607
§ 371 (c)(1),
(2) Date: Dec. 28, 2020

(87) PCT Pub. No.: WO2020/002855
PCT Pub. Date: Jan. 2, 2020

(65) Prior Publication Data
US 2021/0268914 A1 Sep. 2, 2021

(30) Foreign Application Priority Data

Jun. 28, 2018 (FR) ...................................... 1855832

(51) Int. Cl.
*B60L 15/20* (2006.01)
(52) U.S. Cl.
CPC ......... *B60L 15/20* (2013.01); *B60L 2240/421* (2013.01); *B60L 2240/423* (2013.01); *B60L 2260/20* (2013.01)

(58) Field of Classification Search
CPC ............... B60L 15/20; B60L 2240/421; B60L 2240/423; B60L 2240/16; B60L 2260/20;
(Continued)

(56) References Cited

U.S. PATENT DOCUMENTS

| 8,463,477 B2 * | 6/2013 | Kretschmer | ............ B60L 15/20 701/41 |
| 2010/0019709 A1 | 1/2010 | Le Neindre et al. | |

(Continued)

FOREIGN PATENT DOCUMENTS

| JP | H1023614 A | * | 1/1998 | ............. Y02T 10/64 |
| JP | 2010023790 A | * | 2/2010 | |

OTHER PUBLICATIONS

International Search Report and Written Opinion in corresponding International Application No. PCT/FR2019/051607, dated Oct. 9, 2019 (11 pages).

*Primary Examiner* — Michael J Zanelli
(74) *Attorney, Agent, or Firm* — Osha Bergman Watanabe & Burton LLP

(57) ABSTRACT

A method for controlling a rotating electrical machine of a motor vehicle is disclosed. The motor vehicle includes a thermal drive chain including a heat engine connected to a gearbox by means of a clutch. The electrical machine is integrated in the thermal drive chain or in a drive chain independent of the heat engine. When the clutch is open and the rotating electrical machine operates in motor mode in order to ensure the electrical operation of the motor vehicle, the method includes: generating a setpoint torque corresponding to a desire of the driver to accelerate; determining a pulsed compensation torque for torque oscillations generated by the drive chain; combining the setpoint torque and the previously determined pulsed compensation torque in order to obtain a resulting modified setpoint torque; and (Continued)

applying the resulting modified setpoint torque to the rotating electrical machine.

9 Claims, 5 Drawing Sheets

(58) Field of Classification Search
CPC ...... B60L 2260/42; Y02T 10/64; Y02T 10/72; B60Y 2200/91
See application file for complete search history.

(56) References Cited

U.S. PATENT DOCUMENTS

| | | | |
|---|---|---|---|
| 2010/0292879 A1* | 11/2010 | Luedtke | B60L 15/20 903/903 |
| 2011/0112709 A1 | 5/2011 | Park et al. | |
| 2015/0251649 A1* | 9/2015 | Liang | B60W 10/08 903/903 |
| 2018/0073632 A1* | 3/2018 | Kamiya | F16H 61/143 |
| 2018/0312078 A1* | 11/2018 | Message | B60L 15/2063 |

* cited by examiner

METHOD FOR CONTROLLING A ROTARY ELECTRICAL MACHINE IN ORDER TO COMPENSATE FOR THE TORQUE OSCILLATIONS OF A TRACTION CHAIN OF A MOTOR VEHICLE

TECHNICAL FIELD

The present invention relates to a method for controlling a rotary electrical machine in order to compensate for the torque oscillations of a traction chain of a motor vehicle.

BACKGROUND

In a known manner, a traction chain of a motor vehicle comprises a thermal engine which is coupled to a gearbox by means of a clutch. A drive shaft at the output of the gearbox is connected to the wheels mechanically by means of a differential gear and universal joints.

It is known to use a reversible electrical machine coupled to the gearbox. This hybrid system allows the vehicle to use a plurality of functions which associate the electrical machine and the thermal engine in a combined manner or independently. Thus, in particular, the electrical machine can operate in motor mode in order to ensure traction of the vehicle alone or in combination with the thermal engine. The electrical machine can also ensure starting of the thermal engine. This machine can also operate in generator mode, in order to supply energy to the battery of the vehicle, in particular during a recuperative braking phase.

SUMMARY OF THE INVENTION

During phases of purely electric travel, the thermal engine is switched off and uncoupled from the remainder of the power train by opening of the clutch. The electrical machine is then commanded, and supplies torque to the wheel via one of the ratios of the gearbox.

As a result of the rigidity in torsion of the kinematic chain, mainly of the drive shaft and the universal joints, torque oscillations are observed combined with substantial shaking of the vehicle at torque gradients with a high set point. In fact, the assembly acts as a system of the mass-spring type, the resonance frequency of which depends on the speed of the engaged gearbox.

According to the application, reference is made to an engaged gearbox ($1^{st}$, $2^{nd}$ $3^{rd}$, etc.) and to the reduction ratio corresponding to each of these gears (3,3, 1,9, 1,3, etc.). The smallest gear engaged provides the greatest reduction ratio.

The objective of the present invention is to eliminate this disadvantage efficiently by proposing a method for controlling a rotary electrical machine incorporated in a motor vehicle traction chain, the said traction chain comprising a thermal engine which is connected to a gearbox by means of a clutch, the said rotary electrical machine being coupled to the gearbox, characterised in that, when the clutch is open and the rotary electrical machine is operating in motor mode in order to ensure electric travel of the motor vehicle, the said method comprises:
 a step of generation of a set point torque corresponding to a desire of the driver to accelerate;
 a step of determination of a pulsed torque for compensation for torque oscillations generated by the traction chain;
 a step of combination of the set point torque and the pulsed compensation torque previously determined in order to obtain a resulting modified set point torque; and
 a step of application of the resulting modified set point torque to the rotary electrical machine.

The invention thus makes it possible to reduce, or even eliminate, the torque oscillations during travel of the motor vehicle in electric mode, and thus increase the comfort of the passengers. The invention also has an economic nature, in that it can be implemented at least partly by means of software implementation. The invention has a curative role.

The vibrations to be attenuated are derived from the lack of natural damping originating from the thermal engine, in particular associated with the internal friction which is established in the engine when it is connected to the remainder of the drive chain. These vibrations have an amplitude and frequency which are very different from the vibrations associated with the thermal engine.

The electrical machine can be incorporated in the so-called thermal drive chain downstream from the clutch in the direction of the transmission of torque to the wheels of the vehicle. The electrical machine can be incorporated between the clutch and the gearbox. The electrical machine can be incorporated in the gearbox. In particular the electrical machine can be connected in position 2,5. The machine is thus connected either to the even ratios, or to the odd ratios of the gearbox. The electrical machine can be incorporated between the gearbox and the wheels of the vehicle.

As a variant, the machine can be incorporated in a drive chain other than the thermal drive chain, for example in a wheel of the vehicle, or it can be fitted on an axle which is not connected to the thermal drive chain.

According to one embodiment, the pulsed compensation torque depends on a reduction ratio and on a rigidity of the traction chain. In particular, the amplitude and the phase of the pulsed compensation torque are dependent, which makes it possible to adjust the compensation more precisely.

According to one embodiment, in order to determine the pulsed compensation torque, the method comprises:
 a step of measurement of a speed of rotation of the rotary electrical machine, in order to obtain a speed signal;
 a step of extraction of an alternative component of the speed signal; and
 a step of application of a gain to the alternative component of the speed signal.

According to one embodiment, the step of extraction of the alternative component of the speed signal is carried out by application to the speed signal of a pass-band filter having a central frequency corresponding to the frequency of the torque oscillations. The central frequency can be contained between 5 and 13 Hz. The frequency of the filter can depend on the gear ratio engaged. The central frequency of the filter can be contained in a range of values centred ±15% around the frequency of the torque oscillations.

According to one embodiment, the gain depends on a required damping factor.

According to one embodiment, the damping factor is predetermined or depends on a driving mode of the motor vehicle. The damping factor can be contained between 0.25 and 0.7.

According to one embodiment, the pulsed compensation torque is injected in phase opposition relative to the torque oscillations of the traction chain.

According to one embodiment, the said method comprises a prior step of limitation of variations of torque in the set point torque by application of a pre-filter. This pre-filter has a preventative role, in that the torque oscillations to be attenuated will be less pronounced, and thus less difficult to compensate for.

This pre-filter is defined such as to cut off the continuous component and/or such as to cut off the high frequencies, and to permit passage of the frequency associated with the rigidity of the transmission chain in which the electrical machine.

According to one embodiment, the pre-filter is a ramp.

According to one embodiment, the pre-filter is a filter of order N, in particular of order 2, in particular of order 3.

According to one embodiment, the gearbox can be a manual gearbox or a DCT gearbox.

According to one embodiment of the invention, the compensation method can be activated and deactivated by a user of the vehicle.

The invention also relates to a control module of a rotary electrical machine, characterised in that it comprises a memory which stores software instructions for implementation of the method as previously defined.

The invention will be better understood by reading the following description and examining the figures which accompany it. These figures are provided purely by way of illustration, and in no way limit the invention.

Elements which are identical, similar or analogous retain the same reference from one figure to another.

Figure 1:
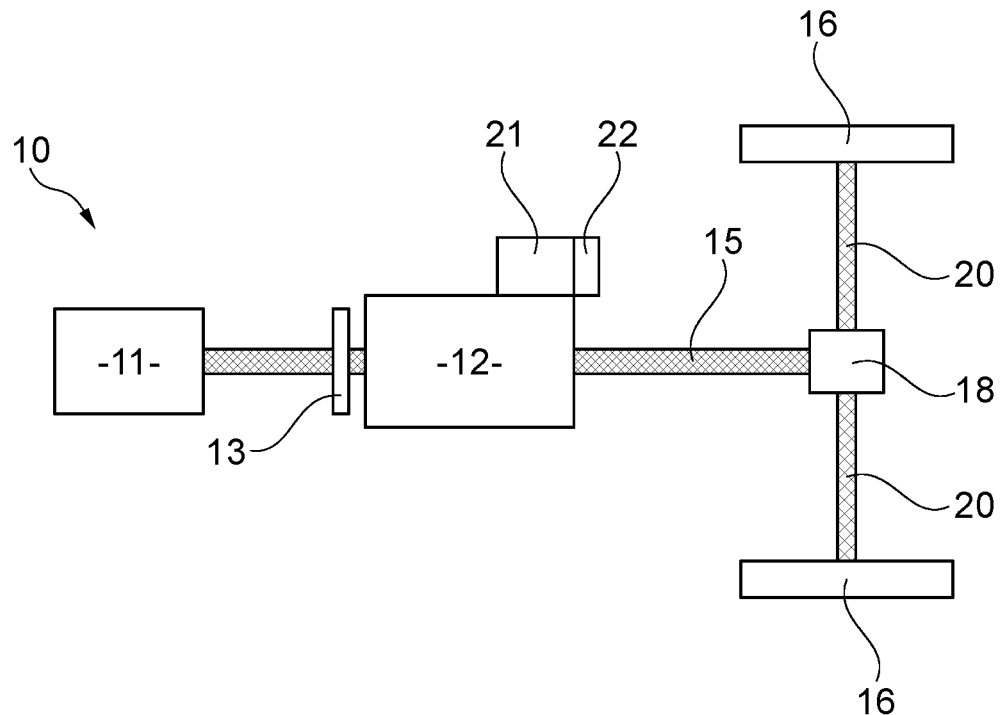
FIG. 1 is a schematic representation of a motor vehicle traction chain implementing the method according to the invention for compensation for the torque oscillations by an electrical machine.
Figure 2:
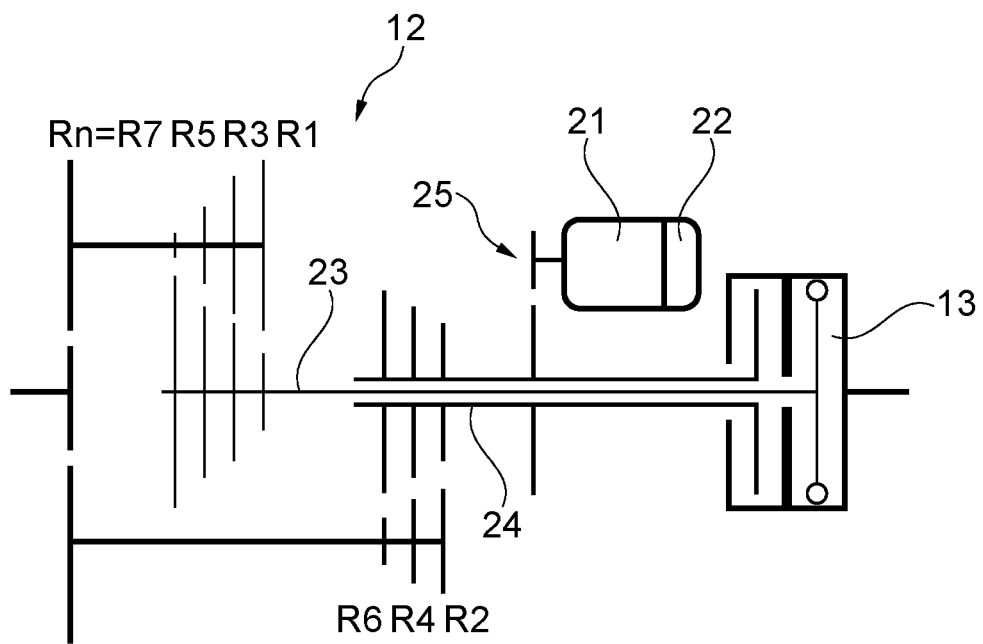
FIG. 2 is a detailed schematic representation of the coupling of the electrical machine with the gearbox.

FIG. 1 shows a traction chain 10 of a motor vehicle comprising a thermal engine 11 coupled to a gearbox 12 by means of a clutch 13. An output drive shaft 15 of the gearbox 12 is connected mechanically to the wheels 16 by means of a differential gear 18 and universal joints 20.

DETAILED DESCRIPTION

A reversible electrical machine 21 is coupled to the gearbox 12. This hybrid system allows the vehicle to use a plurality of functions associating the electrical machine 21 and the thermal engine 11 in a combined manner or independently. Thus, the electrical machine 21 can operate in motor mode in order to ensure traction of the vehicle, alone or in combination with the thermal engine 11. The clutch 13 is open during a phase of electric travel of the vehicle, and closed during a phase of thermal travel of the vehicle. The electrical machine 21 can also ensure starting of the thermal engine 11. This machine 21 can also operate in generator mode, in order to supply energy to the battery of the vehicle, in particular during a recuperative braking phase.

The electrical machine 21 is advantageously a machine of the synchronous double three-phase type connected to an electrical network having an operating voltage 48 V. The electrical machine 21 can have power of between 15 kW and 25 kW, and can supply torque contained in particular between 55 Nm and 80 Nm, depending on its length.

Figure two shows an example of coupling of the electrical machine 21 with the gearbox 12 comprising a plurality of gear ratios R1-Rn. In the example represented, the number of ratios n is 7, but it will be appreciated that this can be adapted according to the application. A first shaft 23 is associated with odd gear ratios, and a second shaft 24 is associated with even gear ratios. A double clutch system 13 makes it possible to connect these shafts 23, 24 in rotation or release them, according to the ratio engaged. The rotary electrical machine 21 is coupled to the gearbox 12 via a speed reducer 25. The electrical machine 21 is in this case coupled to the second shaft 24. The electrical machine 21 can be implanted in the interior or on the exterior of the gearbox 12.

Figure 3:
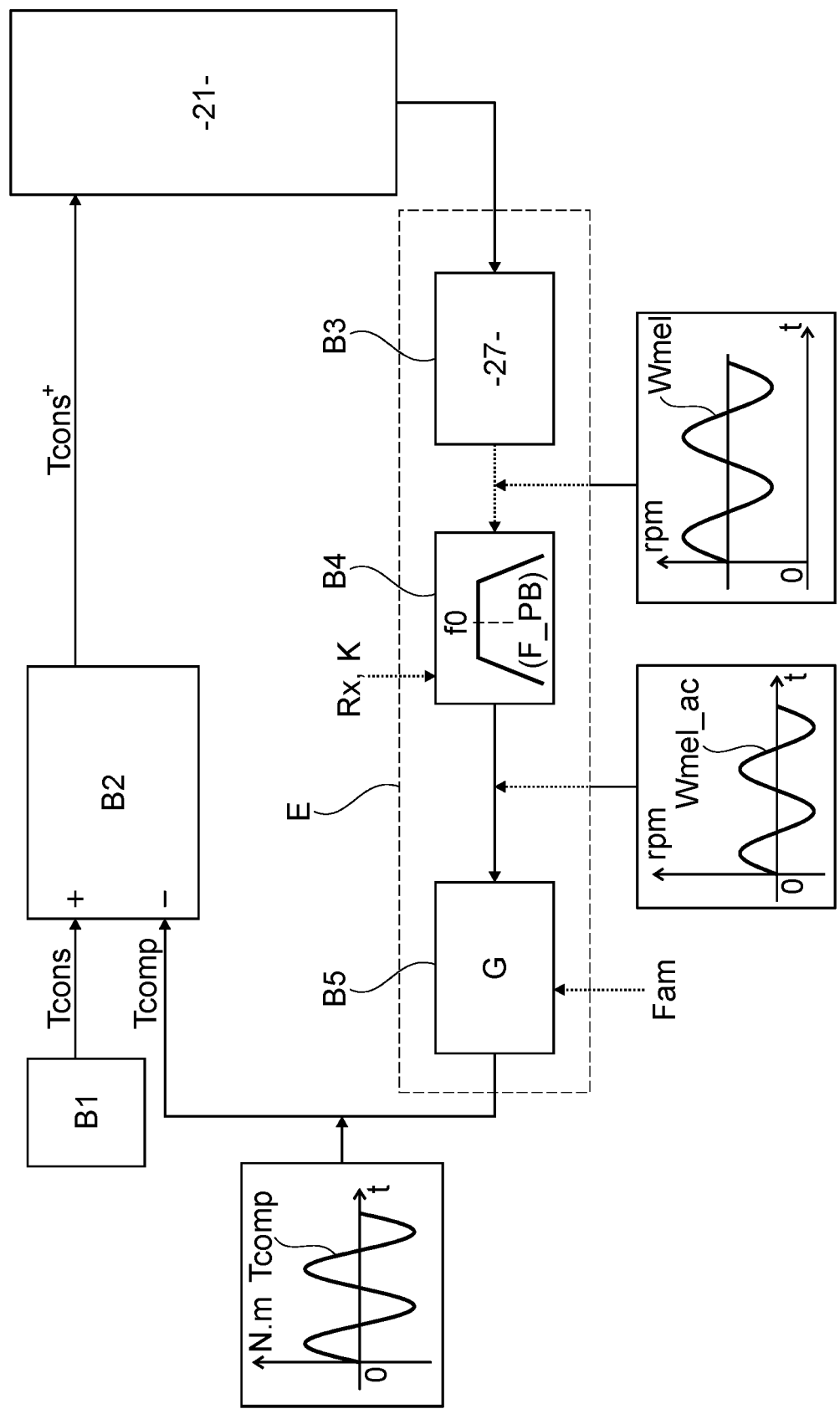
FIG. 3 is a diagram of the functional blocks implemented in the control module for implementation of the method according to the invention for compensation for the torque oscillations generated by the traction chain.

With reference to FIG. 3, a description is provided hereinafter of the different functional blocks which permit implementation of the method for compensation for the torque undulations generated by the traction chain 10 during a phase of electric travel, i.e. when the clutch 13 is open, and the rotary electrical machine 21 is operating in motor mode, in order to ensure the traction of the motor vehicle. The different functional blocks can take the form of software instructions stored in a memory of a control module 22 of the rotary electrical machine 21.

More specifically, the block B1 generates a set point torque Tcons corresponding to a desire of the driver to accelerate, defined in particular by pressing the accelerator pedal of the vehicle.

The set E of functional blocks determines a pulsed compensation torque Tcomp in order to compensate for the torque oscillations Tosc generated by the traction chain 10. The block B2 combines the set point torque Tcons and the pulsed compensation torque Tcomp previously determined in order to obtain a resulting modified set point torque Tcons'. The resulting modified set point torque Tcons' is then applied to the rotary electrical machine 21, and thus to the traction chain 10.

In order to determine the pulsed compensation torque Tcomp, the speed of rotation of the electrical machine 21 is measured by means of a speed sensor 27, via the block B3. At the output from the block B3, this therefore provides a speed signal Wmel. The speed sensor 27 is for example a Hall effect sensor.

An alternative component Wmel_ac of the speed signal is then extracted by application of a pass-band filter F_PB via the block B4. This pass-band filter F_PB has a central frequency f0 corresponding to the frequency of the torque oscillations Tosc. The central frequency f0 of the filter depends on an engaged speed ratio Rx and on a rigidity K of the traction chain 10. The central frequency f0 can for example be obtained by means of a cartography which receives as input the engaged gearbox ratio Rx communicated by the engine computer.

The block B5 then applies a gain G to the filtered speed signal Wmel_ac. The gain G depends on a required damping factor Fam. The damping factor Fam is predetermined, or depends on a driving mode of the motor vehicle. The greater the damping factor Fam, the shorter the period of attenuation of the torque oscillations Tosc is.

The pulsed compensation torque Tcomp is injected by the block B2 in phase opposition relative to the torque oscillations Tosc of the traction chain 10.

Figure 4A:
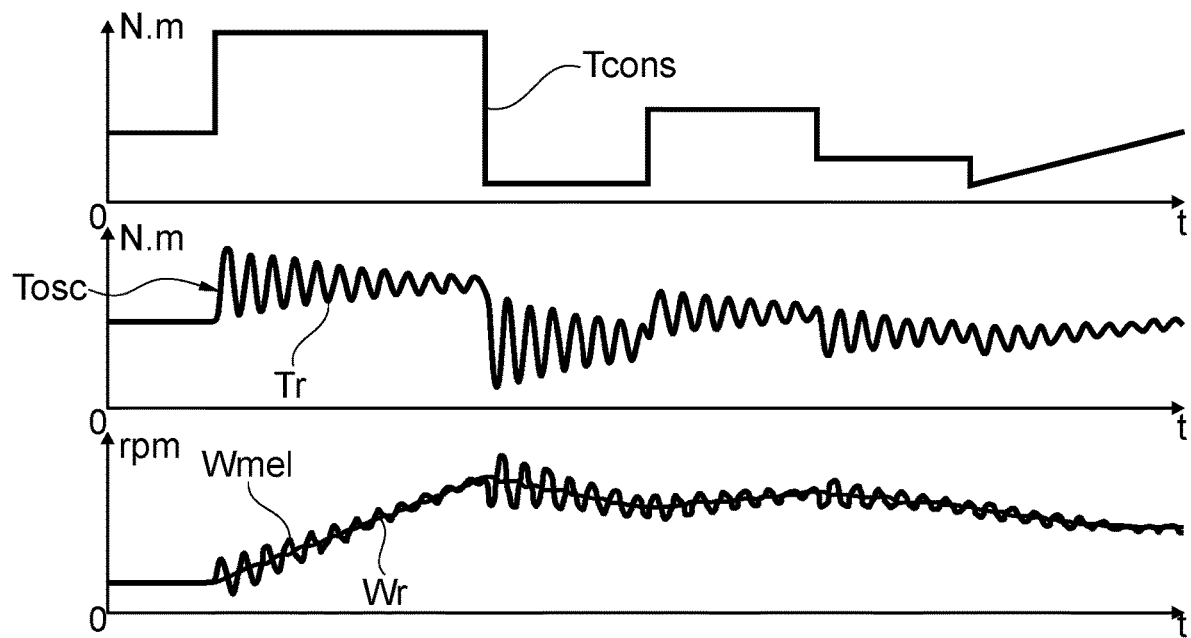
FIGS. 4a and 4b are graphic representations, on a time basis, of the set point torque, of the torque on the wheels, of a speed of rotation of the wheels, and of the electrical machine, obtained respectively with and without implementation of the method according to the invention.

FIG. 4a is a graphic representation, on a time basis, of the set point torque Tcons, of the torque on the wheels Tr, of a speed of rotation of the wheels Wr, and of the electrical machine Wmel obtained without implementation of the method according to the invention.

Figure 4B:
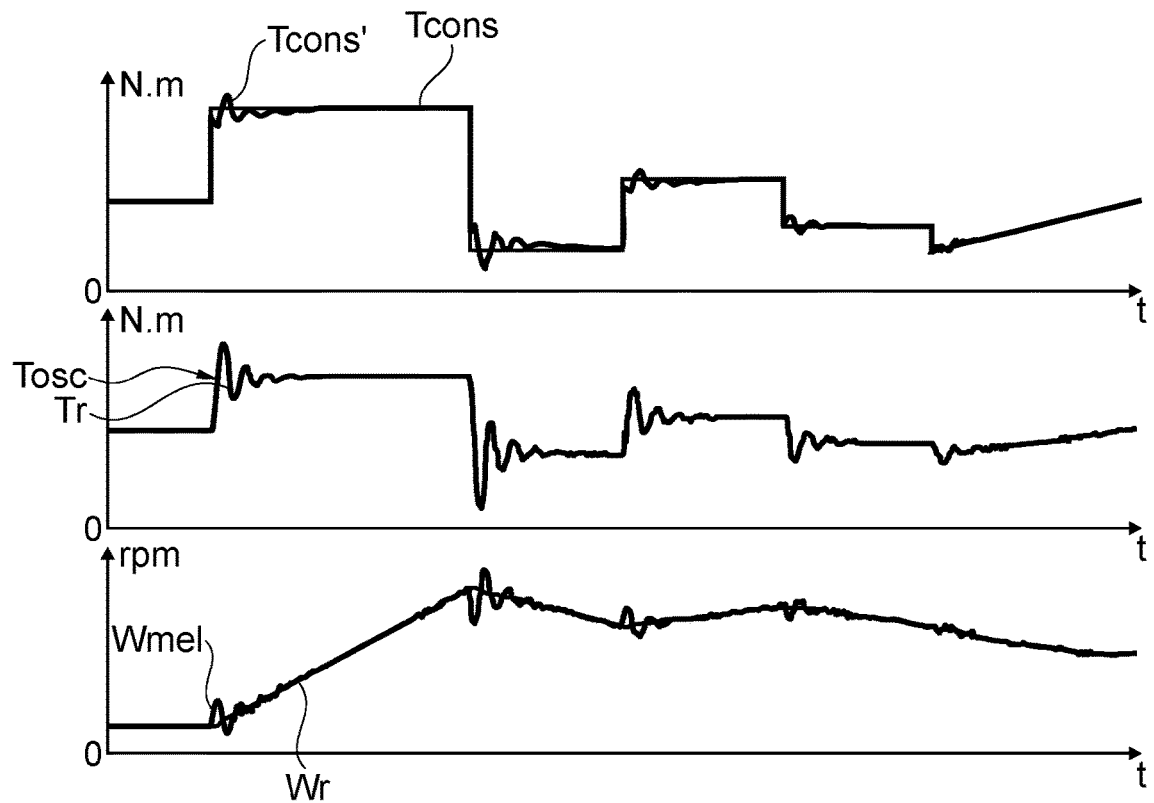

FIG. 4b is a graphic representation, on a time basis, of the set point torque Tcons, of the resulting modified set point torque Tcons' incorporating the pulsed compensation torque Tcomp, of the torque on the wheels Tr, of a speed of rotation of the wheels Wr, and of the electrical machine Wmel obtained with implementation of the method according to the invention.

It can be seen that the torque undulations on the wheels Tr are attenuated thanks to implementation of the invention, which incorporates the pulsed compensation torque Tcomp in the set point torque Tcons.

Figure 5:
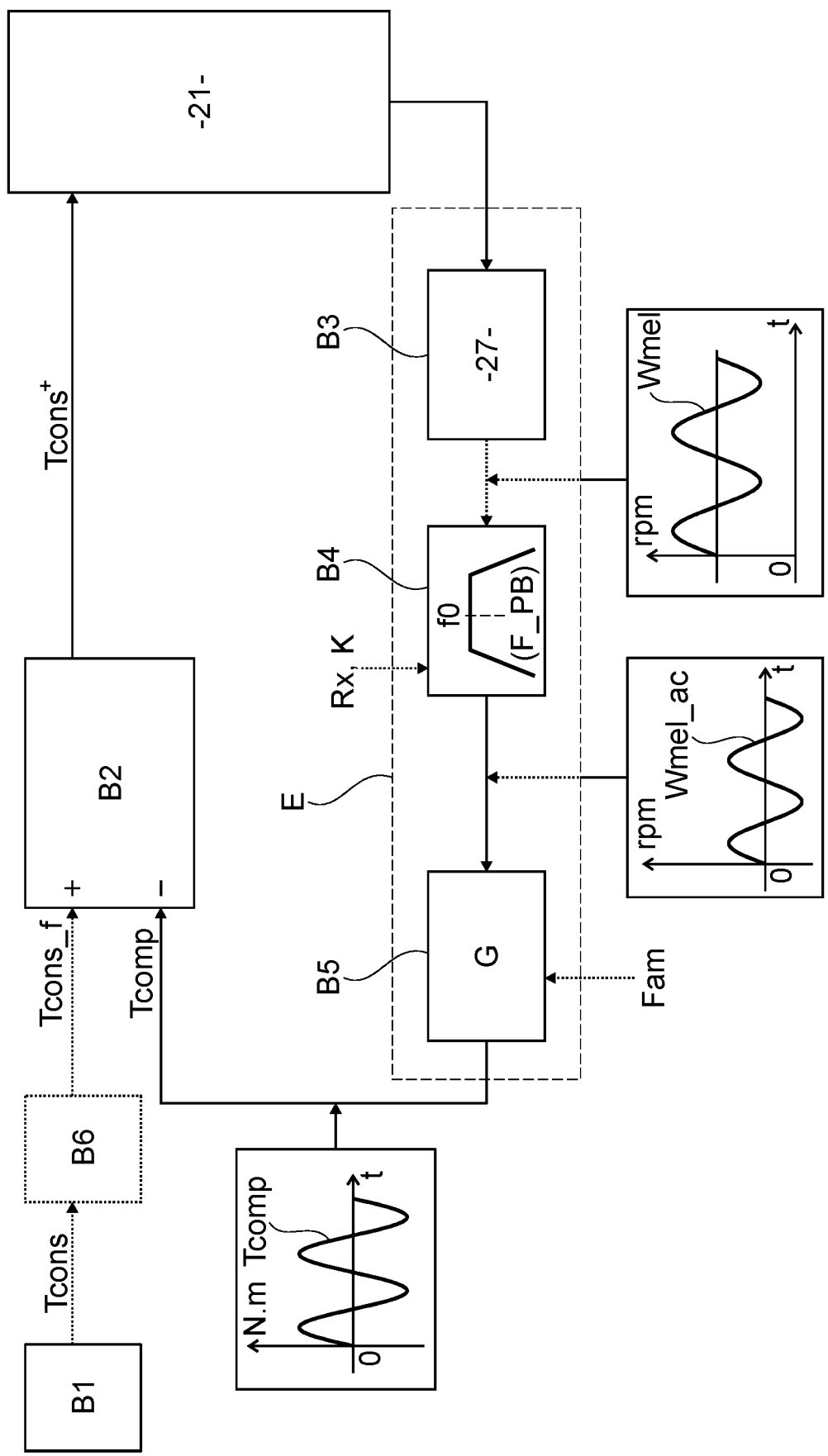
FIG. 5 illustrates a variant embodiment of the method according to the invention comprising a prior preventative filtering step for the set point cut-off.

In the embodiment in FIG. 5, the method comprises a prior step of limitation of variations of torque in the set point torque Tcons by application of a pre-filter via the block B6.

Figure 6A:
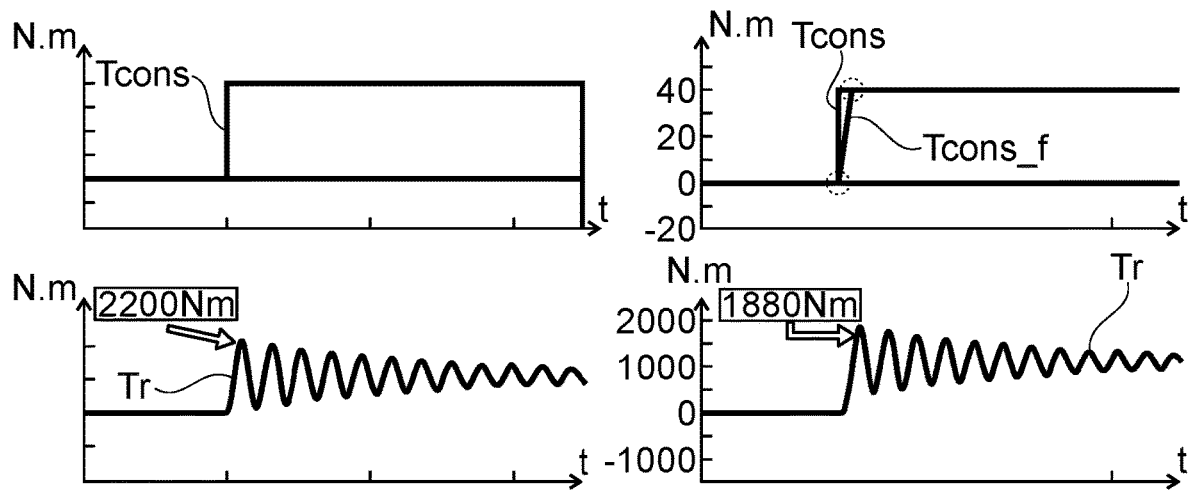
FIGS. 6a and 6b are graphic representations illustrating the attenuation of the torque peak on the wheel respectively with a filter of the ramp type and a filter of the first order applied to the set point torque.

As illustrated by FIG. 6a, the pre-filter can be a ramp making it possible to obtain a filtered set point torque Tcons_f. The limitation of the instantaneous torque variation makes it possible to reduce the peak value of the torque on the wheel Tr by approximately 20 to 25%.

Figure 6B:
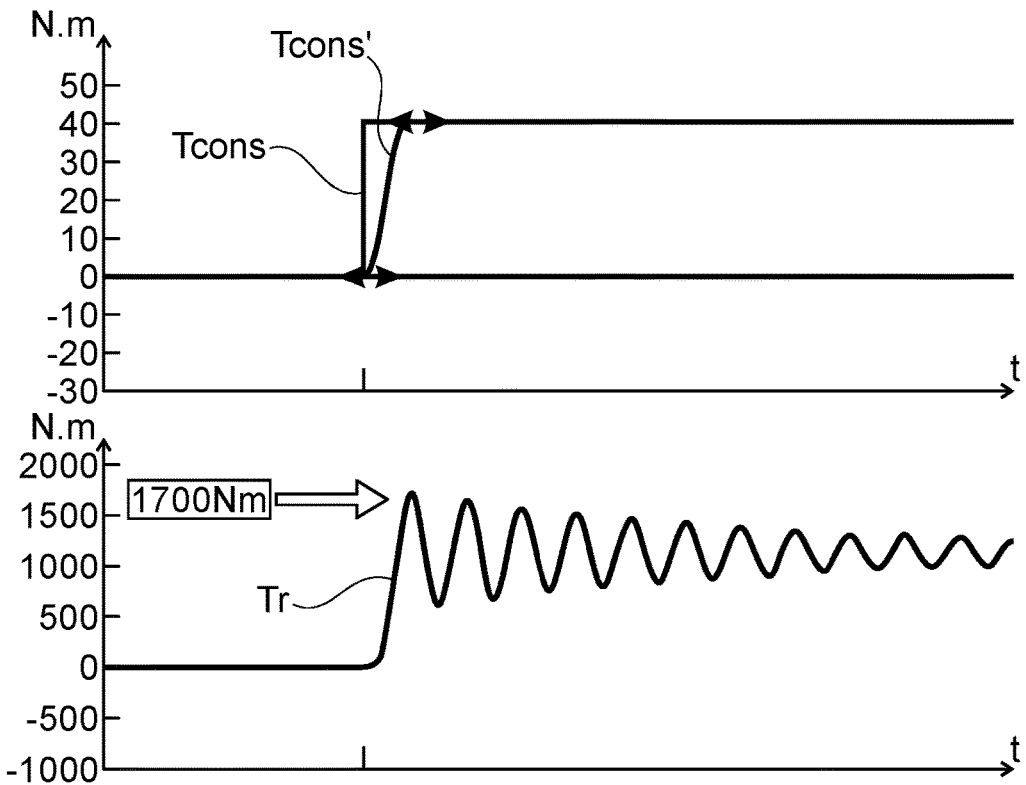

As illustrated by FIG. 6b, the pre-filter can be a filter of the 1st order, which introduces gradients into the filtered set point torque Tcons_f, as well as horizontal tangents at "take-off", i.e. at the beginning and at "landing", i.e. at the end of the set point stage, thus reducing the oscillations of the torque on the wheel Tr by an additional 10% compared with the pre-filter of the ramp type.

More generally, the pre-filter can be a filter of order N. The higher the order N of the filter, the less the own modes of the traction chain 10 will be subjected to stress.

It will be appreciated that the foregoing description has been provided purely by way of example, and does not limit the field of the invention, a departure from which would not be constituted by replacing the different elements by any other equivalents.

In addition, the different characteristics, variants, and/or embodiments of the present invention can be associated with one another according to different combinations, provided that they are not incompatible or mutually exclusive.

The invention claimed is:

1. A method for controlling a rotary electrical machine of a motor vehicle, the motor vehicle comprising a traction chain comprising a thermal engine which is connected to a gearbox by a clutch, the rotary electrical machine being incorporated in a thermal drive chain or in an independent drive chain of the thermal engine,
wherein when the clutch is open and the rotary electrical machine is operating in motor mode in order to ensure electric travel of the motor vehicle, the method comprises:
generation of a set point torque corresponding to a desire of the driver to accelerate;
determination of a pulsed compensation torque for compensation for torque oscillations generated by the traction chain;
combination of the set point torque and the pulsed compensation torque previously determined in order to obtain a resulting modified set point torque; and
application of the resulting modified set point torque to the rotary electrical machine, and
wherein both of an amplitude and a phase of the pulsed compensation torque depend on both of a reduction ratio corresponding to gears of the gearbox and on a rigidity of the traction chain.

2. The method according to claim 1, wherein, in order to determine the pulsed compensation torque, the method further comprises:
measurement of a speed of rotation of the rotary electrical machine to obtain a speed signal;
extraction of an alternative component of the speed signal; and
application of a gain to the alternative component of the speed signal.

3. The method according to claim 2, wherein extraction of the alternative component of the speed signal is carried out by application to the speed signal of a pass-band filter having a central frequency corresponding to the frequency of the torque oscillations.

4. The method according to claim 2, wherein the gain depends on a required damping factor.

5. The method according to claim 4, wherein the damping factor (Fam) is predetermined or depends on a driving mode of the motor vehicle.

6. The method according to claim 1, wherein the pulsed compensation torque is injected in phase opposition relative to the torque oscillations of the traction chain.

7. The method according to claim 1, further comprising, applying a pre-filter to limit variations of torque in the set point torque.

8. The method according to claim 7, wherein the pre-filter is a ramp or a filter of order N.

9. A control module of a rotary electrical machine, the control module comprising: a memory storing software instructions for implementation of the method as claimed in claim 1.

* * * * *